Figure 1:
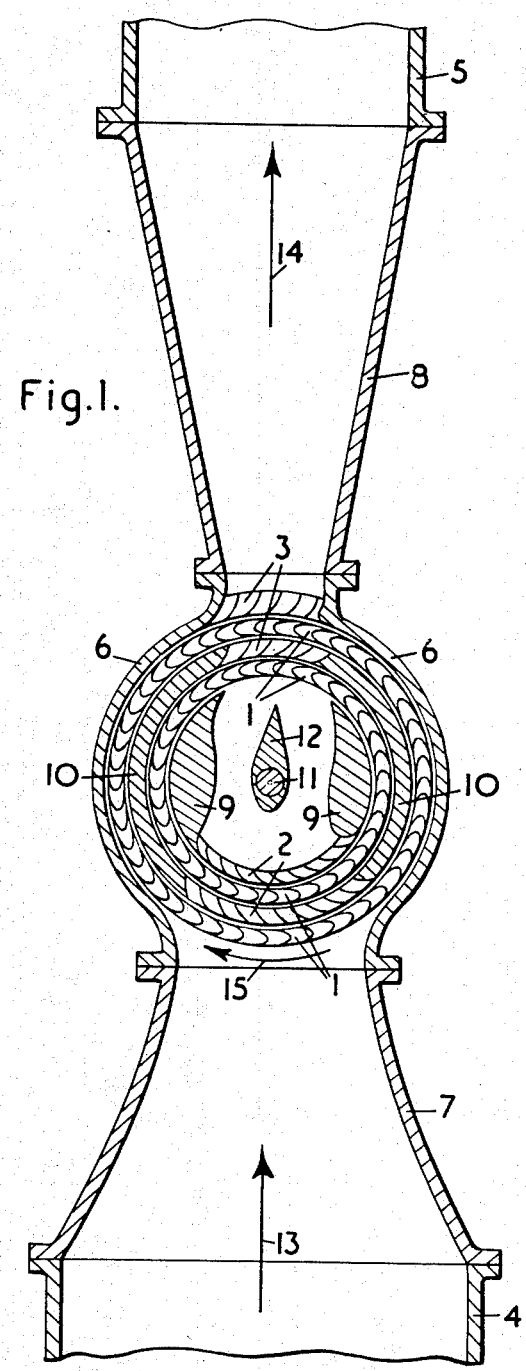

Nov. 10, 1953
A. R. HOWELL
2,658,700
TURBOCOMPRESSOR POWER PLANT FOR AIRCRAFT
Filed Aug. 2, 1945
3 Sheets-Sheet 3
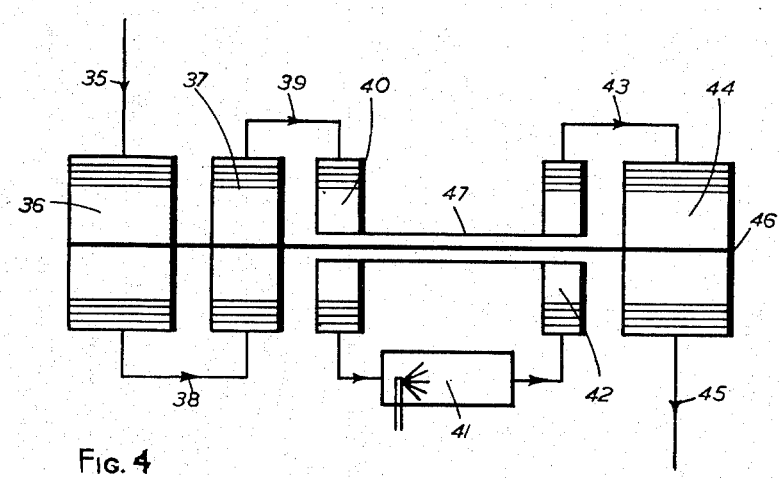
FIG. 4
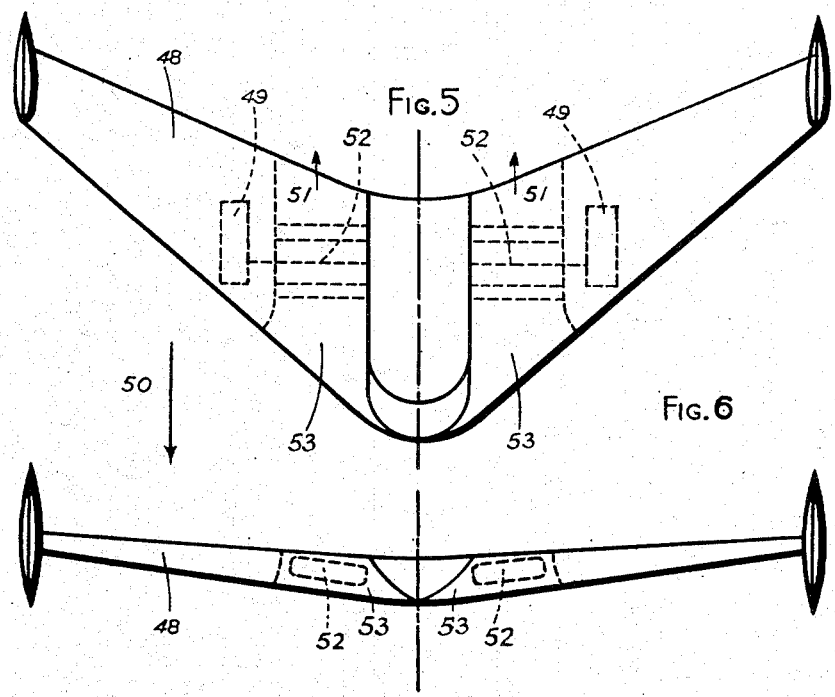
FIG. 5
FIG. 6
Inventor
Adrian Raymond Howell
By
Stevens and Davis
his Attorneys Patented Nov. 10, 1953

2,658,700

UNITED STATES PATENT OFFICE 2,658,700

TURBOCOMPRESSOR POWER PLANT FOR AIRCRAFT

Alun Raymond Howell, Neath, Wales, assignor to Power Jets (Research and Development) Ltd., London, England, a British company Application August 2, 1945, Serial No. 608,482
In Great Britain July 28, 1943

Section 1, Public Law 690, August 8, 1946
Patent expires July 28, 1963

2 Claims. (Cl. 244—15)

This invention relates to compressors in which the fluid flows past cascades of blades afforded by one or more rows of blades arranged concentrically and with the blade lengths parallel to the axis of rotation. The invention also relates to the combination in a gas turbine power plant of compressors of the type hereinbefore referred to and further to the installation of such a gas turbine power plant as an aircraft prime mover.

Compressors having this arrangement of blading have hitherto been of the radial flow type in which either the inflow has been axial and the outflow radial or the outflow has been axial and the inflow radial, so that any particular moving blade row is used in one stage only. With these more conventional radial flow types of compressors the fluid ducting arrangements are usually complicated in that they involve the use of at least one volute or similar inefficient form of duct in order to accommodate the driving shaft and, in some instances, the associated driving machine.

An object of the present invention is the provision of a new or improved compressor of the type herein first referred to and in which effective double or two stage use of a moving blade row is attained and the use of complicated ducting is avoided.

Certain prior proposals concerned with the construction of turbines disclose arrangements having a single row of rotor blading disposed parallel to the axis of rotation with partial admission such that fluid flow takes place at one or more parts of the circumference radially inwards across the blading and at one or more other parts of the circumference radially outwards across the blading.

According to this invention a compressor of the type first referred to comprises at least one row of axially disposed rotor blades and stationary duct-forming means defining a flow-channel for the fluid across the rotor blade rows, such that the fluid flows radially inwards across the rotor blades over one part of the circumference occupied by said blades and radially outwards over another part of said circumference, whereby each rotor blade acts on the fluid twice in the course of one revolution, and wherein the rotor blades have a substantially radial chord line and are of symmetrical profile about a line normal to and bisecting the chord line, the whole being such as to afford rotor blading of substantially pure impulse form, i. e., such that the blade passages (having regard to their radial disposition) are effectively of substantially constant geometrical cross-section, the blading doing work substantially only by causing change of direction of the flow without change of pressure.

In addition to the row or rows of rotor blading, one or more rows of guide blading is or are preferably povided, said blading being pitched on circles concentric with the rotor blade rows to receive the output at least from the inlet blading and being of reaction profile, i. e., such that a substantial pressure rise takes place across the guide blading. Preferably, the guide blading is confined to such parts of the circumference of those circles as are traversed by the flow channel.

According to a feature of the invention, the compressor comprises two or more concentric rows of rotor blading, thus providing four or more stages of compression.

For defining the fluid flow channel in the interior of the compressor, i. e. within the circle defined by the innermost row of rotor or stator blading, internal (non-rotating) fairings may be provided and if the shaft or shafts carrying the rotor or rotors on which the rotor blading is/are mounted traverses the fluid flow channel within the interior of the compressor a stream-lined fairing preferably encloses the said shaft or shafts.

If more than one row of rotor blades are provided they may be mounted either on the same rotor or on independent rotors, and in the latter case the said rotors may rotate either in the same direction or in contrary direction; further, the fluid flow channel may either be straight through the compressor, i. e. diametrically, or the mean directions of flow at entry and outlet may be oblique to one another.

In more particularly describing the invention, reference will be made to Fig. 1 of the drawing which illustrates, by way of example only, a section taken across the rotation axis of one type of compressor designed according to the invention. The invention will also be described with reference to the drawings accompanying this complete specification in which, for the sake of convenience, the views have been designated Figs. 2 to 6 inclusive.

Referring now to Fig. 1 of the drawings the compressor comprises a cylindrical nest of moving or rotor blade rows 1, inlet stationary blade rows 2 and outlet stationary blade rows 3 placed between the two parts 4 and 5 of the ducting, the compressor proper being contained within a casing 6 which is connected with the ducting 4 and 5 by shaped inlet and outlet pieces 7 and 8 respectively. Shaped internal fairings 9 and the closed or no-admission parts 10 of the stationary blade rows 2 and 3 determine the general direction of the flow path through the compressor, whilst aerodynamic losses are reduced by enclosing the shaft 11, which drives the moving blade rows 1, by a stationary shaft fairing 12.

The general direction of fluid flow at inlet and outlet of the compressor is shown by the arrows 13 and 14 respectively, and the direction of rotation of the moving blade rows 1 is indicated by the arrow 15.

It will be seen that the compressor affords two stages of moving blades 1 and stationary blades 2 on the inlet side, followed by two stages of moving blades 1 and stationary blades 3 on the outlet side, making a total of four stages but with the use of only two moving blade rows as compared with the four moving blade rows normally required for a four stage compressor or turbine of the conventional radial flow type.

As hereinbefore mentioned the use of impulse blade profiles for the rotor blading is an essential feature of the invention.

The advantage of this is that if any form of reaction blading were employed any rise of pressure across the blading at the entry end of the flow channel would be compensated by a corresponding pressure drop across the blading at the exit end of the flow channel. This, however, does not apply to the stator blading since the profiles and angles of the stator blading at the entry and exit ends of the flow channel respectively may be made to differ appropriately so that a pressure rise across the stator blading takes place both at entry and exit, with the incidental advantage that the velocity between entry and exit is reduced.

The use of impulse blading for some at least of the stator blade rows would be feasible, but in general it would offer no advantage; rather it would call for additional complication in the form of intricate internal ducting and is not compatible with the ideal of a substantially straight-through flow channel for the fluid.

If the increase of total head imparted by the compressor is required in the form of pressure head, the pressure rise must take place across the stator blading or in diffuser ducting, the latter being generally a source of loss and inefficiency and therefore to be avoided.

If the increase of total head is required in the form of velocity head it is better to expand the delivery of the compressor down to the final pressure in an expansion duct, rather than attempt to design the compressor of the type herein described as a purely impulse machine.

The fluid actually flows radially only in the middle of the flow path; towards the boundary walls the flow may be far from radial, and in this connection provision may be made for fitting the stationary rows with blades the forms of which vary from the middle of the flow path to the boundary walls in order to give improved aerodynamic efficiency. Entry guides in the form of stationary blade rows may be fitted before the first moving blade rows of the inlet and/or outlet stages when they are required for aerodynamic stability or other reasons, and provision also may be made for individual blades, whether moving or stationary, to be adjusted for control purposes.

Figure 2:
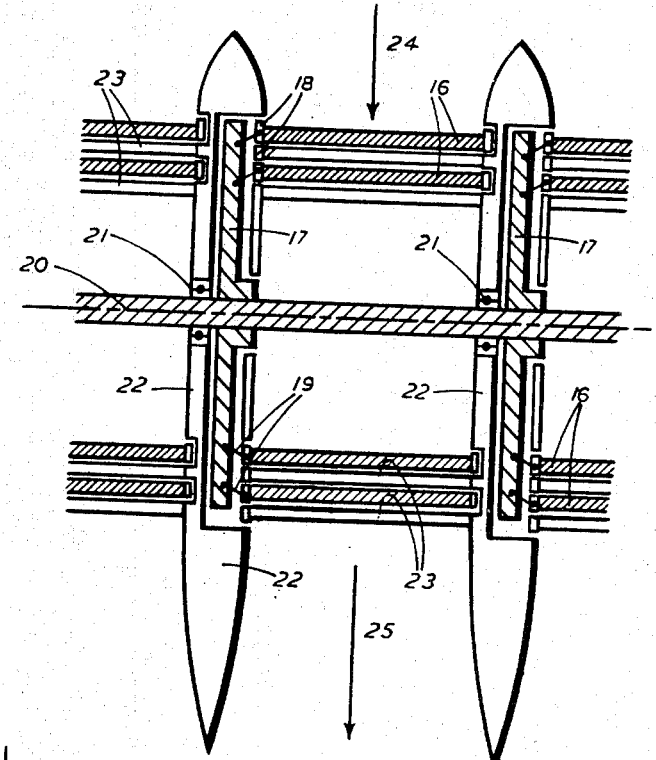

Constructionally, circumferential rings are used for holding one or both ends of the moving blades, and one or both of these rings may be attached to a disc or discs on the driving shaft or shafts, the attachment being either rigid or flexible as with the "dumb-bell" held rings in Ljungstrom radial flow turbines. When only the blade holding rings at one end of the moving blade rows are attached to the disc or discs, stationary blade rows and internal fairings may be inserted from the other end. An example of this arrangement for a two moving blade row compressor is shown in Fig. 2, which is a section through the axis of rotation following the mean plane of fluid flow. The rotor blade rows 16 are attached to the discs 17 by means of the circumferential rings 18 and the attachment members 19. The discs 17 are fixed on to the shaft 20 which rotates in the bearings 21 located in the stationary member 22. The rest of stationary blade rows 23 are fitted to the stationary member 22. The general direction of fluid flow at inlet and outlet of the compressor is shown by the arrows 24 and 25 respectively. The section of the shaft fairing 12 (Fig. 1) has not been shown in Fig. 2.

Figure 3:
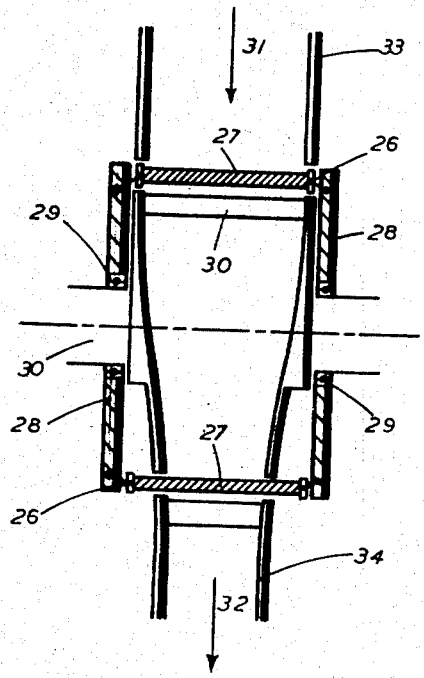

For the special case of a compressor having a single moving blade row and one set of internal stationary blade rows and fairings, it is possible, as shown in Fig. 3, to have the blade rings 26 at both ends of the moving blades 27 attached to discs 28, the discs 28 would run on bearings 29 fixed to the internal stationary parts and blade row 30 and would be driven externally, instead of internally with an axial shaft. No shaft fairing 12 (Fig. 1) is required for the arrangement of Fig. 3. The drives for the multiple number of moving blade rows can also be taken externally instead of from internal axial shafts if use is made of gear, chain or belt drives on to the attaching moving blade discs. It will be noticed that in Fig. 3, the duct passage of the stationary members 30 is decreased in axial length along the direction of fluid flow, indicated by the arrows 31 at inlet and 32 at outlet, between the inlet duct 33 and the outlet duct 34. Such an arrangement is particularly advantageous when considerable density changes occur in the compressor. The stationary member 22 and the stationary blade rows 23 of Fig. 2 can also be arranged to give similar passages to that in Fig. 3.

The axial length of the blades which can be used is limited by stress and other factors, and in order to provide for long effective blade lengths to be used compressors may be built up of a number of units or blade assemblies, such as that above described, arranged end-on to one another and having the same axis of rotation; another method would be to employ subsidiary circumferential rings to support the blades intermediate their ends.

Whereas the invention has been described more particularly with reference to a four stage compressor, it will be understood that this in no way limits the scope of the invention, and it will be clear to those skilled in the art that the invention can be applied equally well to other compressors having a single or a multiple number of moving blade rows. Also it will be clear that the invention can be applied to compressors to give mixed flow conditions, with the same advantages as for radial flow, by arranging one or more of the moving blade rows and/or stationary blade rows to guide the fluid at inlet and outlet of the machine to a direction parallel to the axis or to some other desirable direction.

The invention also includes the application of compressors as herein described to a gas turbine engine comprising a compressor and turbine of similar construction to the compressor. These components may be coupled together by a shaft or by a common blade attachment disc, and the combustion chamber may be arranged so that the direction of flow of the gas through the turbine is the same as, opposite to, or inclined to that of the air through the compressor, as required for the specific machine under design. One or more of these combinations of compressor and turbine will afford single or compound gas turbine engines respectively, the excess power of which can be used as jet thrust or as shaft power, taken from the main turbine or an auxiliary turbine.

As an example, a diagrammatic sketch of one of these arrangements is given in Fig. 4. The arrangement is for a two shaft double compound engine with the L. P. compressor driven by the L. P. turbine and the H. P. compressor driven, independently of the L. P., by the H. P. turbine. The entering air indicated by the arrow 35 passes through the L. P. compressor 36 and 37 comprising two units 36 and 37 connected by the ducting denoted by 38, after which it flows via the ducting 39 into the H. P. compressor 40. The air then flows into the combustion chamber 41 and the resulting hot gas flows through the H. P. turbine 42, the ducting 43, the L. P. turbine 44 and then leaves via the outlet ducting 45. The two shafts, shown concentric, are indicated by 46 and 47. It is of interest to note that allowance for the variation of density on the compression side of the engine can be made, when required, by reducing the blade heights in the various compressors the air flows through, while keeping the blade shapes more or less the same for all the compressors. Again when high pressure ratios are required from one compressor, numbers of units can be coupled up as for the two units 36 and 37 of the L. P. compressor in the above example, and similarly for the turbines.

The arrangement of ducting shown in Fig. 4 is particularly suitable if only small head room is available as, for example, inside the wing of an aircraft, as then all the ducting and the combustion chamber can be kept in roughly the same plane (the plane of the paper in Fig. 4). It will be understood that the previous description of one engine in no way limits the scope of the invention as the number of shafts and units of compressors and turbines can be chosen at will.

A special application of compressors, designed according to the invention, is to fluid reaction propulsion, thrust and lift systems. Thus for the propulsion of marine craft and aircraft such compressors can be placed in ducts and the fluid, after passing through the compressor, be ejected as a jet. With aircraft, the ducts may be arranged in nacelles, fuselages and thick wings, the air drawn in being ejected as a jet. If directed downwards, the jet can be used for imparting lift to the aircraft; in this instance the duct would normally be perpendicular to the plane of the aircraft.

The use of the compressors for the thrust propulsion of an aircraft is illustrated in Figs. 5 and 6, as an example only.

The compressors 52 are shown installed in two ducts 53 of a flying wing aircraft 48. The engines 49 driving the compressors can be placed where most convenient. The direction of flight is indicated by the arrow 50 and the direction of flow from the compressor by the small arrows 51. Flaps, similar to the normal type of controlling flaps on aircraft, can be placed, if roughly rectangular in form, at the rear end of the duct 53 for the adjustment of the outlet jet.

What I claim as my invention and desire to secure by Letters Patent is:

1. An elastic fluid compressor comprising a rotor; a ring of axially extending rotor blades attached thereto with their chord lines radially directed, each said blade being of impulse type and symmetrical about a line normal to and bisecting its chord line; a stationary casing enclosing said rotor and having a peripheral wall, said wall being apertured at diametrically opposite locations to define an inlet and an outlet said inlet being of greater area than said outlet, extending around only a comparatively small portion of the rotor periphery; means defining a radially directed inlet passage leading to said inlet, means defining a radially directed outlet passage leading from said outlet, and means forming a flow passage extending diametrically across the interior of the rotor and aligned with said inlet and outlet passages; a row of stator blades immediately downstream of the rotor blades at the inlet end of said diametral flow passage and a further row of stator blades in said outlet passage immediately downstream of the rotor blades, each said stator blade being of the reaction type.

2. In an airplane having a wing, a propulsion unit mounted in the wing and comprising in combination an air compressor and driving means for said compressor; said compressor comprising a rotor mounted with its axis in a plane substantially normal to the direction of flight of the airplane; a ring of axially extending rotor blades attached thereto with their chord lines radially directed, each said blade being of the impulse type and symmetrical about a line normal to and bisecting its chord line; a stationary casing enclosing said rotor and having a peripheral wall, said wall being apertured at diametrically opposite locations to define an inlet and an outlet said inlet being of greater area than said outlet, extending around only a comparatively small portion of the rotor periphery; means defining a radially directed inlet passage leading from atmosphere to said inlet, means defining a radially directed outlet passage leading from said outlet to a rearwardly directed propulsive nozzle, and means forming a flow passage extending diametrically across the interior of the rotor and aligned with said inlet and outlet passages, said passages extending substantially in the direction of flight of the airplane; a row of stator blades immediately downstream of the rotor blades at the inlet end of said diametral flow passage and a further row of stator blades in said outlet passage immediately downstream of the rotor blades, each said stator blade being of the reaction type.

ALUN RAYMOND HOWELL.

References Cited in the file of this patent

UNITED STATES PATENTS

| Number | Name | Date |
|---|---|---|
| 507,445 | Mortier | Oct. 24, 1893 |
| 801,585 | Hachenberg | Oct. 10, 1905 |
| 823,526 | Hachenberg | June 19, 1906 |
| 877,502 | Hachenberg | Jan. 28, 1908 |
| 1,186,950 | Seguin | June 13, 1916 |
| 1,741,578 | Lyons | Dec. 31, 1929 |
| 1,823,579 | Anderson | Sept. 15, 1931 |
| 1,868,143 | Heinze | July 19, 1932 |
| 1,945,289 | Nicolatos | Jan. 30, 1934 |
| 2,396,911 | Anxionnaz | Mar. 19, 1946 |